(12) United States Patent
Brummer et al.

(10) Patent No.: US 9,043,207 B2
(45) Date of Patent: May 26, 2015

(54) SPEAKER RECOGNITION FROM TELEPHONE CALLS

(75) Inventors: Johan Nikolaas Langehoven Brummer, Somerset West (ZA); Luis Buera Rodriguez, Madrid (ES); Marta Garcia Gomar, Madrid (ES)

(73) Assignee: Agnitio S.L., Madrid (ES)

( * ) Notice: Subject to any disclaimer, the term of this patent is extended or adjusted under 35 U.S.C. 154(b) by 409 days.

(21) Appl. No.: 13/509,606

(22) PCT Filed: Nov. 12, 2009

(86) PCT No.: PCT/EP2009/008063
§ 371 (c)(1),
(2), (4) Date: May 12, 2012

(87) PCT Pub. No.: WO2011/057650
PCT Pub. Date: May 19, 2011

(65) Prior Publication Data
US 2012/0232900 A1    Sep. 13, 2012

(51) Int. Cl.
*G10L 17/00*    (2013.01)
*G10L 17/02*    (2013.01)

(52) U.S. Cl.
CPC ..................................... *G10L 17/02* (2013.01)

(58) Field of Classification Search
CPC ....... G10L 17/00; G10L 17/005; G10L 17/02; G10L 17/04; G10L 17/06; G10L 17/08; G10L 17/14; G10L 17/16; G10L 17/20
USPC ........................... 704/239, 246, 248, 249, 250
See application file for complete search history.

(56) References Cited

U.S. PATENT DOCUMENTS 5,598,507 A     1/1997   Kimber et al.
5,659,662 A  *  8/1997   Wilcox et al. ................. 704/245
(Continued)

FOREIGN PATENT DOCUMENTS

ES    WO2009135517 A1    12/2009

OTHER PUBLICATIONS

Ondrej Glembek et al, "Comparison of Scoring Methods Used in Speaker Recognition with Joint Factor Analysis", Acoustics, Speech and Signal Processing, 2009. ICASSP 2009. IEEE International Conference on, IEEE, Piscataway, NJ, USA, Apr. 19, 2009, XP031460165; ISBN: 978-1-4244-2353-8.

(Continued)

*Primary Examiner* — Qi Han
(74) *Attorney, Agent, or Firm* — Galvin Patent Law LLC; Brian R. Galvin

(57) ABSTRACT

The present invention relates to a method for speaker recognition, comprising the steps of obtaining and storing speaker information for at least one target speaker; obtaining a plurality of speech samples from a plurality of telephone calls from at least one unknown speaker; classifying the speech samples according to the at least one unknown speaker thereby providing speaker-dependent classes of speech samples; extracting speaker information for the speech samples of each of the speaker-dependent classes of speech samples; combining the extracted speaker information for each of the speaker-dependent classes of speech samples; comparing the combined extracted speaker information for each of the speaker-dependent classes of speech samples with the stored speaker information for the at least one target speaker to obtain at least one comparison result; and determining whether one of the at least one unknown speakers is identical with the at least one target speaker based on the at least one comparison result.

13 Claims, 1 Drawing Sheet

(56) References Cited

U.S. PATENT DOCUMENTS

| | | |
|---|---|---|
| 7,295,970 B1 | 11/2007 | Gorin et al. |
| 7,953,219 B2 * | 5/2011 | Freedman et al. ....... 379/265.06 |
| 8,160,877 B1 * | 4/2012 | Nucci et al. ................... 704/246 |
| 2009/0043573 A1 | 2/2009 | Weinberg et al. |

OTHER PUBLICATIONS

Ondre J Glembek et al, "Comparison of Scoring Methods Used in Speaker Recognition with Joint Factor Analysis", Acoustics, Speech and Signal Processing, 2009. ICASSP 2009. IEEE International Conference on, IEEE, Piscataway, NJ, USA, Apr. 19, 2009, pp. 4057-4060, XP031460165; ISBN: 978-1-4244-2353-8, abstract.

* cited by examiner

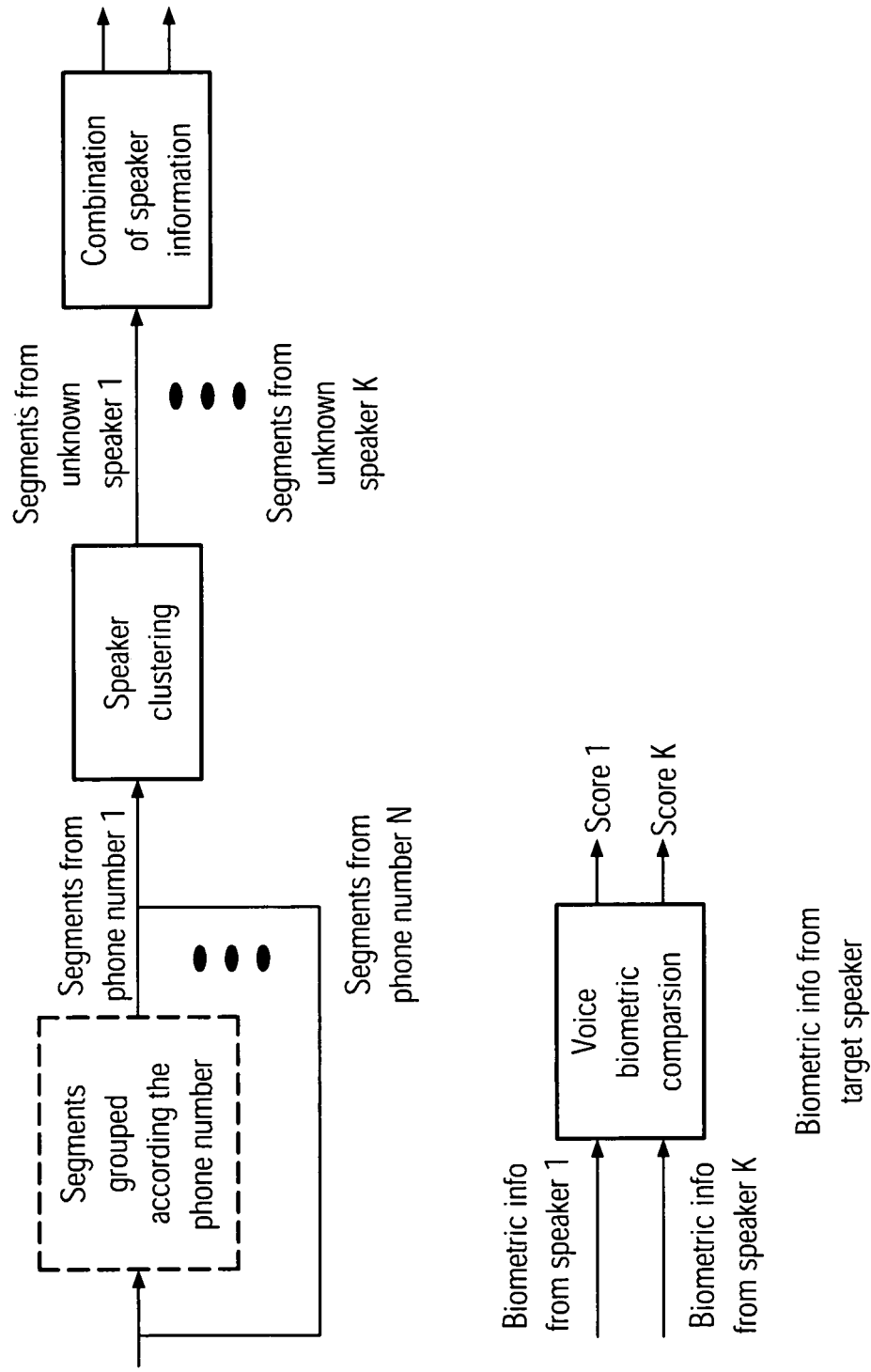

SPEAKER RECOGNITION FROM TELEPHONE CALLS

FIELD OF INVENTION

The present invention relates to the art of automatic speaker recognition and, in particular, speaker identification from incoming telephone calls.

BACKGROUND OF THE INVENTION

Speaker recognition plays an important role in the context of intelligence investigations during which a huge number of telephone calls is to be analyzed with respect to the speaker's identity. For example, a particular at least one target speaker is tracked based on a set of speech samples obtained for the at least one target speaker during telephone calls in the past. According to another example, screening of incoming telephone calls is performed in order to alert staff when a known speaker was on the line. Speaker Identification may be requested for a number of different criminal offences, such as making hoax emergency calls to the police, ambulance or fire brigade, making threatening or harassing telephone calls, blackmail or extortion demands, taking part in criminal conspiracies, etc.

Conventionally, a new speech sample of an unknown speaker of a new incoming telephone call is analyzed in order to determine whether or not the speech sample matches other samples of already identified speakers. It is determined whether the new speech sample matches on or more known ones to a predetermined degree defined in terms of some distance measure or similarity metrics.

For example, Gaussian Mixture Model metrics can be employed to determine whether a Gaussian Mixture Model derived for the new speech sample of the unknown speaker has a distance to Gaussian Mixture Models derived for already identified known speakers below some predetermined threshold. Particularly, the well-known Kullback-Leibler distance can be used.

However, automatic speaker identification still is a demanding task, since the reliability of the methods for speaker recognition in telephone calls is not considered sufficient and still prove error-prone with respect to the confusion of unknown speakers with know ones.

Thus, it is an object of the present invention to provide a method for speaker recognition in telephone calls with improved accuracy as compared to the art.

DESCRIPTION OF THE INVENTION

In view of the above, the present invention provides a method for speaker recognition according to claim 1. This method comprises the steps of obtaining and storing speaker information for at least one target speaker;

obtaining a plurality of speech samples from a plurality of telephone calls from at least one unknown speaker (that may or may not be different from the at least one target speaker);

classifying the speech samples according to the at least one unknown speaker thereby providing one, two or more speaker-dependent classes of speech samples (one single class for each of the unknown speakers);

extracting speaker information of speech samples of each of the speaker-dependent classes of speech samples;

combining the extracted speaker information for each of the speaker-dependent classes of speech samples (to obtain for each class combined extracted speaker information);

comparing the combined extracted speaker information for each of the speaker-dependent classes of speech samples with the stored speaker information for the at least one target speaker to obtain at least one comparison result; and determining whether one of the at least one unknown speakers is identical with the at least one target speaker based on the at least one comparison result.

In the final step of determining whether one of the at least one unknown speakers is identical with the at least one target speaker based on the at least one comparison result it is to be understood that identity of the unknown speaker and the target speaker is determined when the comparison result shows that the combined extracted speaker information and the stored speaker information for the target speaker are similar enough within predetermined limits. If the similarity is above some predetermined threshold, for example, it is determined that the unknown speaker and the target speaker are identical.

The speaker information for at least one target speaker (known speaker) is obtained, for example, by speaker enrolment as it is known in the art. The speaker information for the at least one target speaker can be obtained by obtaining a plurality of speech samples of the at least one target speaker. At least one of the plurality of speech samples of the at least one target speaker may be obtained from a telephone call of the at least one target speaker or at least some of the plurality of speech samples of the at least one target speaker are obtained from a plurality (at least two) telephone calls. Particularly, the speaker information for at least one target speaker can be obtained from either isolated words or continuous speech captured by a microphone or a telephone, for example, and converted to analogue electronic signals that subsequently are digitalized. Particularly, classifying the speech samples according to the at least one unknown speaker can be based on features (feature vectors) obtained by a feature analysis of the speech samples.

The digital signals can be subject to a subsequent spectral analysis. Recent representations of the speech waveforms sampled typically at a rate between 6.6 kHz and 20 kHz are derived from the short term power spectra and represent a sequence of characterizing vectors containing values of what is generally referred to as features/feature parameters. Then, a Gaussian Mixture Model (Gaussian Mixed Model) comprising a Gaussian density distribution of the generated feature vectors can be established that represents the elements of utterances of the at least one target speaker, i.e. phonemes, syllables, words, etc. Both the combined extracted speaker information for each of the speaker-dependent classes of speech samples and the stored speaker information for the at least one target speaker may comprise information represented by Gaussian Mixture Models.

It is an object of the present invention to determine whether an incoming telephone call is made by a speaker that subsequently can be identified as the at least one target speaker. Different from conventional approaches according to the present invention, a plurality of speech samples from a plurality of telephone calls from at least one unknown speaker (that may or may not be different from the at least one target speaker) is obtained and classified (grouped) in order to achieve speaker-dependent classes of the speech samples such that the speech samples of each of the unknown speakers are respectively assigned to a particular class.

If speech sample of only one unknown speaker are considered, only one class of speech samples is derived. However, it is a plurality of speech samples of the at least one unknown speaker that is used to extract speaker information for the at least one unknown speaker. To be more definite for at least a number of the speech samples of one class speaker information is extracted and subsequently combined and it is the combined extracted speaker information of a class that is compared with the stored speaker information of the at least one target speaker. When a number r of speech samples of at least one unknown speaker is obtained it might be preferred to combine speaker information extracted from these speech samples in a weighted manner. For instance, speaker information obtained from s<r speech samples of at least a predetermined minimum overall quality and/or predetermined minimum duration and or predetermined minimum signal-to-noise level may be given higher weights than speaker information obtained from t=r-s speech samples that do not exhibit the respective minimum level(s).

For example, combining the extracted speaker information for each of the speaker-dependent classes of speech samples may comprise generating for a particular class a combined Gaussian Mixture Model from the extracted speaker information of the speech samples of that class. According to an example of the inventive method, the combined Gaussian Mixture Model is generated from individual Gaussian Mixture Models obtained for the speech samples of that class, in particular, from Gaussian Mixture Models wherein each of these Models is obtained for one of the speech samples (see also description of FIG. 1 below).

According to another advantageous example the combined speaker information is achieved by combining feature vectors comprising some hundred features (e.g. more than 100 or 200 and/or less than 300 or 400 features), e.g., obtained by a feature analysis of one speech sample of a speaker and feature vectors obtained by a feature analysis of another speech sample of the same speaker. For example, the combined speaker information may be generated by vector summation of feature vectors obtained from the one speech sample of the same speaker and feature vectors obtained from the other speech sample of the same speaker. The summation may be performed for pairs of feature vectors respectively comprising one feature vector obtained from the one speech sample and one feature vector obtained from the other speech sample of the same speaker, in particular, where the two feature vectors are close to each other within some predetermined limits. The combined speaker information, in this case, is obtained based on the respective resulting feature vectors. Particularly, the above-mentioned comparison result may be obtained based on scalar products of the resulting feature vectors representing the combined speaker information and feature vectors representing target speaker information.

In view of the above, for each class of speech samples obtained by classifying the speech samples of the incoming telephone calls according to the at least one unknown speaker a single grade of similarity with the stored speaker information of the at least one target speaker can be obtained by comparing the combined extracted speaker information for each of the speaker-dependent classes of speech samples with the stored speaker information for the at least one target speaker.

In the art, a single incoming telephone call is analyzed for speaker information of an unknown speaker making the telephone call and the thus obtained speaker information is compared with stored speaker information of a target speaker. Since in the present invention a number of speech samples obtained by a number of telephone calls (at least two telephone calls) are used to derive speaker information for the unknown speaker making these telephone calls and the combined extracted speaker information for that unknown speaker is used for the matching process with the stored target speaker information, an unprecedented accuracy of speaker recognition can be achieved.

According to an example the inventive method comprises grouping of the telephone calls according to the telephone numbers of the telephone calls before classifying the speech samples according to the at least one unknown speaker. The process of grouping according to the telephone numbers can accelerate the process of classification according to the at least one unknown speaker.

For instance, pre-classification may be performed for individual groups of speech samples of the respective same telephone numbers and subsequently classification according to the unknown speakers can be performed based on the pre-classification. In this case, a number t of u speech samples obtained for a telephone number a may be pre-classified to belong to a particular unknown speaker and a number v of w speech samples obtained for a different telephone number b may be pre-classified to belong to the same particular unknown speaker and, then, all samples t+v can be classified to belong to a single class corresponding to that unknown speaker.

However, in order to avoid insensitivity against usage of a particular number by more than one speaker, the classification according to the at least one unknown speaker shall advantageously not be made for each group obtained by grouping according to the telephone number separately. If this was done, errors due to the implicit assumption that a specific telephone number is used by a single speaker only might occur. Rather, classification shall be performed for all telephone numbers.

Other filters different from grouping according to the telephone numbers, for example, grouping according to the date or time of the telephone calls and/or the place from where and to where the calls are made may be alternatively or additionally applied.

According to an example of the inventive method, the speech samples according to the at least one unknown speaker are classified by a speaker clustering technique. The speaker clustering technique may be based on a Gaussian Mixture Model and a Gaussian Mixture Model metric. The metric may be based on distance measures know in the art, for example, a Euclidean distance, the Mahalanobis distance or the Kullback-Leibler distance.

Speech samples are classified to belong to the same class, if the respective distance measure to other samples of the class is below some predetermined threshold. Moreover, Agglomerative Hierarchical Clustering can be used for the classification of unknown speakers. Agglomerative Hierarchical Clustering is known in the art per se and is based on a tree-like data structuring wherein nodes describe a group of observations that are characteristic for a particular class of data.

Classes described in parent nodes are determined by merging the characteristics defined in the corresponding child nodes. In order to effectively stop the recursive clustering process when the clustering error rate is minimum a the Baye's information criterion might be employed that checks whether or not the closest pairs of clusters are homogeneous in terms of speaker identity before every merging by quantifying a statistical distance between the clusters. Clusters are regarded as being homogeneous, if the statistical distance is less that a predetermined threshold. Other criterions that might be employed are the Information Change Rate and the Generalized Likelihood Ratio.

In order to reduce channel effects a Joint Factor Analysis may be employed (for details, see for example, S.-C. Yin, R. Rose and P. Kenny, A Joint Factor Analysis Approach to Progressive Model Adaptation in Text-Independent Speaker Verification", IEEE Transactions on Audio, Speech and Language Processing, Vol. 15, 7, 2007-8-20, pages 1999-2010).

The present invention also provides a computer program product comprising one or more computer readable media having computer-executable instructions for performing steps of the method for speaker recognition according to one of the above-described examples when run on a computer.

Furthermore, in order to address the above-mentioned object it is provided a speaker recognition means, comprising a database configured to store speaker information for a target speaker;

means configured to classify speech samples of telephone calls according to at least one unknown speaker thereby providing one, two or more speaker-dependent classes of speech samples;

means to extract speaker information for the speech samples of each of the speaker-dependent classes of speech samples;

means configured to combine the extracted speaker information for each of the speaker-dependent classes of speech samples;

means configured to compare the combined extracted speaker information for each of the speaker-dependent classes of speech samples with the stored speaker information for the at least one target speaker to obtain at least one comparison result; and means configured to determine whether one of the at least one unknown speakers is identical with the at least one target speaker based on the at least one comparison result.

Additionally, the speaker recognition means may comprise means configured to receive telephone calls from at least one unknown speaker. The speaker recognition means may further comprise means configured to group the telephone calls according to the telephone numbers of the telephone calls, in particular, before the telephone calls are processed by the means configured to classify the speech samples.

The speaker recognition means may be configured to perform any of the steps of the above-described examples of the inventive method.

Additional features and advantages of the present invention will be described with reference to the drawing. In the description, reference is made to the accompanying FIGURE that is meant to illustrate an example of the invention. It is understood that such an example does not represent the full scope of the invention.

FIG. 1 illustrates an example of the inventive method of speaker recognition comprising speaker clustering and combination of speaker information from individual speech samples or segments.

As shown in FIG. 1 according to an example of the herein disclosed method for speaker recognition incoming telephone calls are grouped according to the respective telephone numbers of the calls. Speech samples/segments obtained from telephone calls with a telephone number 1 are grouped in a group 1, speech samples/segments obtained from telephone calls with a telephone number 2 are grouped in a group 2 and so forth up to group N consisting of telephone calls with a telephone number N. In a next step speaker clustering is performed. For example, speaker clustering based on Agglomerative Hierarchical Clustering as mentioned above can be performed in order to achieve N classes wherein (ideally) each of the classes includes speech samples/segments from one of K unknown speakers only.

It is of importance that according to the present invention a plurality of speech samples/segments is considered for an unknown speaker that is to be identified against one or more target speakers the speaker information of which is stored beforehand. The plurality of speech samples/segments is processed by a module for the combination of the speaker information for each of the classes into which the speech samples have been classified during speaker clustering.

It may be preferred that speaker information obtained during the speaker clustering, for example, spectral envelopes, pitches, MEL frequency cepstral coefficients, etc., of individual unknown speakers, are used by the module for the combination of the speaker information. Alternatively, new speaker information is generated by this module. The output of this module represents combined speaker information for each of the unknown speaker K separately. The speaker information is biometric information for unknown speakers 1 to K uniquely representing verbal utterances by these speakers. In particular, the biometric information can be generated in form of Gaussian Mixture Models as mentioned above.

For example, speech samples classified to correspond to an unknown speaker 1 are processed for feature analysis. Based on a speech sample from one telephone call a Gaussian Mixture Model is generated. Then, from another speech sample from another telephone call that is also classified to correspond to the same unknown speaker 1 another Gaussian Mixture Model is generated. Subsequently, a combined Gaussian Mixture Model is generated from the Gaussian Mixture Model generated on the basis of the speech sample of the one telephone call and the other Gaussian Mixture Model generated on the basis of the other speech sample of the other telephone call.

Consider feature vectors representing Gaussians within a Gaussian Mixture Model for the one speech sample from one telephone call. This Gaussian Mixture Model may be supplemented by feature vectors of the other Gaussian Mixture Model generated on the basis of the other speech sample of the other telephone call. Additionally or alternatively when one feature vector of one Gaussian Mixture Model is close to another feature vector of another Gaussian Mixture Model within a predetermined limit, a feature vector of the combined Gaussian Mixture Model may be generated by some average of the two feature vectors of the one and the other Gaussian Mixture Model. The distances between the feature vectors, in principle, could be determined by distance measures known in the art, e.g., some Euclidean distance, the Mahalanobis distance or the Kullback-Leibler distance. The distances between the feature vectors may also be determined based on scalar products of these feature vectors.

The combination of speaker information may, alternatively, be based on a direct combination of feature vectors from one or more first speech samples of an unknown speaker and feature vectors of one or more speech samples of the same unknown speaker wherein combination may comprises summation of feature vectors to generate resulting feature vectors representative for the combined speaker information. Again, resulting feature vectors may result from the summation of two or more feature vectors that are close to each other within predetermined limits. Moreover, summation may be a weighted summation wherein the weights are selected according to a predetermined minimum overall quality and/or predetermined minimum duration and or predetermined minimum signal-to-noise level.

According to the example of the present invention shown in FIG. 1, the speaker information (biometric information) of speaker 1 to K are subject to voice biometric comparison with speaker information obtained and stored for one or more target speakers. Again, some distance measure as mentioned-above may be employed during the comparison process. In particular, according to the present example a score is obtained for each of the speaker information corresponding to the unknown speaker 1 to K. The scores measure similarity between the respective speaker information corresponding to the unknown speakers and the stored speaker information for a target speaker.

The outcomes of the voice biometric comparison can be rank ordered and N-best lists can be generated based on the rank-ordered outcomes. The speaker information of an unknown speaker that best matches the stored speaker information of a target speaker is determined and the corresponding unknown speaker is identified as the target speaker when the degree of matching is above a predetermined threshold, for example. Moreover, text-independent recognition processing may be supplemented by text-dependent recognition processing, in general. For this purpose, code books based on Gaussian Mixture Models may be employed as it is known in the art.

It should be stated that according to the above-described invention and contrary to the art speaker recognition/identification is based on more than one telephone call from an unknown speaker. The speech samples of these telephone calls are used to determine whether or not the unknown speaker is identical with a target speaker whose biometric information has previously been obtained and stored for comparison purposes. By using the (classified) speech sample of the unknown speaker for the matching process accuracy and reliability of speaker recognition/identification can significantly be enhanced as compared to the art.

All previously discussed embodiments are not intended as limitations but serve as examples illustrating features and advantages of the invention. It is to be understood that some or all of the above described features can also be combined in different ways.

The invention claimed is:

1. A method for speaker recognition, comprising the steps of
    obtaining and storing, in a database on a computer, speaker information for at least one target speaker;
    obtaining a plurality of speech samples from a plurality of telephone calls from at least one unknown speaker;
    classifying, using software stored and operating on the computer, the speech samples according to the at least one unknown speaker thereby providing one, two or more speaker-dependent classes of speech samples;
    extracting, using software stored and operating on the computer, speaker information for the speech samples of each of the speaker-dependent classes of speech samples;
    combining, using software stored and operating on the computer, the extracted speaker information for each of the speaker-dependent classes of speech samples;
    comparing, using software stored and operating on the computer, the combined extracted speaker information for each of the speaker-dependent classes of speech samples with the stored speaker information for the at least one target speaker to obtain at least one comparison result; and
    determining, using software stored and operating on the computer, whether one of the at least one unknown speakers is identical with the at least one target speaker based on the at least one comparison result.

2. The method of claim 1, further comprising grouping of the telephone calls according to the telephone numbers of the telephone calls.

3. The method of claim 2, wherein the speaker information for the at least one target speaker are obtained by obtaining a plurality of speech samples of the at least one target speaker.

4. The method of claim 3, wherein at least one of the plurality of speech samples of the at least one target speaker is obtained from a telephone call of the at least one target speaker.

5. The method of claim 4, wherein the speech samples according to the at least one unknown speaker are classified by a speaker clustering technique, in particular, by Agglomerative Hierarchical Clustering.

6. The method of claim 5, wherein the speaker clustering technique is based on a Gaussian Mixture Model and a Gaussian Mixture Model metric.

7. The method of claim 6, wherein the speaker clustering technique employs a Joint Factor Analysis.

8. The method of claim 1, wherein combining the extracted speaker information for each of the speaker-dependent classes of speech samples comprises generating for a particular class a combined Gaussian Mixture Model from the extracted speaker information of the speech samples of that class.

9. The method of claim 6, wherein the combined Gaussian Mixture Model is generated from Gaussian Mixture Models of the speech samples of that class.

10. The method of claim 1, wherein combining the extracted speaker information for each of the speaker-dependent classes of speech samples comprises combining feature vectors obtained for one or more speech samples of a speaker-dependent class with feature vectors of one or more other speech samples of the same speaker-dependent class, in particular, by summation of at least some of the feature vectors, more particularly, comprising adding a feature vector of one speech sample of the speaker-dependent class and another feature vector of another speech sample of the speaker-dependent class, if they are close to each other within predetermined limits.

11. A system for performing speaker recognition, comprising:
    a database stored and operating on a computer and configured to store speaker information for a target speaker;
    software means stored and operating on the computer and configured to classify speech samples of telephone calls according to at least one unknown speaker thereby providing one, two or more speaker-dependent classes of speech samples;
    software means stored and operating on the computer and confugured to extract speaker information for the speech samples of each of the speaker-dependent classes of speech samples;
    software means stored and operating on the computer and configured to combine the extracted speaker information for each of the speaker-dependent classes of speech samples;
    software means stored and operating on the computer and configured to compare the combined extracted speaker information for each of the speaker-dependent classes of speech samples with the stored speaker information for the at least one target speaker to obtain at least one comparison result; and
    software means stored and operating on the computer and configured to determine whether one of the at least one unknown speakers is identical with the at least one target speaker based on the at least one comparison result.

12. The system of claim 11, further comprising software means stored and operating on the computer and configured to receive telephone calls from at least one unknown speaker.

13. The system of claim 11, further comprising software means stored and operating on the computer and configured to group the telephone calls according to the telephone numbers of the telephone calls.

\* \* \* \* \*